(12) United States Patent
Xu

(10) Patent No.: US 10,323,522 B2
(45) Date of Patent: Jun. 18, 2019

(54) GAS TURBINE ENGINE COMPONENT WITH DIFFUSIVE COOLING HOLE

(71) Applicant: United Technologies Corporation, Farmington, CT (US)

(72) Inventor: JinQuan Xu, East Greenwich, RI (US)

(73) Assignee: United Technologies Corporation, Farmington, CT (US)

( * ) Notice: Subject to any disclaimer, the term of this patent is extended or adjusted under 35 U.S.C. 154(b) by 360 days.

(21) Appl. No.: 15/231,159

(22) Filed: Aug. 8, 2016

(65) Prior Publication Data

US 2016/0341048 A1 Nov. 24, 2016

Related U.S. Application Data

(63) Continuation of application No. 13/544,153, filed on Jul. 9, 2012, now Pat. No. 9,410,435.

(Continued)

(51) Int. Cl.
*F01D 5/18* (2006.01)
*F01D 9/06* (2006.01)
(Continued)

(52) U.S. Cl.
CPC ............. *F01D 5/186* (2013.01); *F01D 9/041* (2013.01); *F01D 9/065* (2013.01); *F01D 25/12* (2013.01);
(Continued)

(58) Field of Classification Search
CPC . F01D 5/186; F01D 5/187; F01D 9/06; F01D 9/065; F01D 25/12; F05D 2240/81;
(Continued)

(56) References Cited

U.S. PATENT DOCUMENTS

| | | | |
|---|---|---|---|
| 4,197,443 A | | 4/1980 | Sidenstick |
| 4,529,358 A | * | 7/1985 | Papell ................... F01D 5/186 |
| | | | 415/115 |

(Continued)

FOREIGN PATENT DOCUMENTS

| | | |
|---|---|---|
| EP | 1326007 A2 | 7/2003 |
| EP | 1609949 A1 | 12/2005 |

(Continued)

OTHER PUBLICATIONS

Jack D. Mattingly, "Elements of Gas Turbine Propulsion,"1996, GE-1014.001-GE1014.129, McGraw-Hill, Inc., United States.

(Continued)

*Primary Examiner* — Carlos A Rivera
*Assistant Examiner* — Danielle M. Christensen
(74) *Attorney, Agent, or Firm* — Kinney & Lange, P.A.

(57) ABSTRACT

A component for a gas turbine engine includes a gas path wall having a first surface, a second surface exposed to hot gas flow, and a cooling hole extending through the gas path wall. The cooling hole includes an inlet formed in the first surface, an outlet formed in the second surface, cooling hole surfaces that define the cooling hole between the inlet and the outlet, and a longitudinal ridge formed along at least one of the cooling hole surfaces. The longitudinal ridge separates the cooling hole into first and second lobes. The cooling hole diverges through the gas path wall, such that cross-sectional area of the cooling hole increases continuously from the inlet through the cooling hole to the outlet.

16 Claims, 10 Drawing Sheets

Related U.S. Application Data

(60) Provisional application No. 61/599,242, filed on Feb. 15, 2012.

(51) Int. Cl.
*F01D 9/04* (2006.01)
*F01D 25/12* (2006.01)

(52) U.S. Cl.
CPC ...... *F05D 2220/32* (2013.01); *F05D 2240/12* (2013.01); *F05D 2240/24* (2013.01); *F05D 2240/81* (2013.01); *F05D 2260/202* (2013.01); *F23R 2900/03042* (2013.01); *Y02T 50/676* (2013.01)

(58) Field of Classification Search
CPC ..... F05D 2260/202; F23R 2900/03042; Y02T 50/676
See application file for complete search history.

(56) References Cited

U.S. PATENT DOCUMENTS

| | | |
|---|---|---|
| 4,622,821 A | 11/1986 | Madden |
| 4,653,279 A | 3/1987 | Reynolds |
| 4,653,983 A | 3/1987 | Vehr |
| 4,672,727 A | 6/1987 | Field |
| 4,684,323 A | 8/1987 | Field |
| 4,700,544 A | 10/1987 | Fucci |
| 4,738,588 A | 4/1988 | Field |
| 5,062,768 A | 11/1991 | Marriage |
| 5,096,379 A | 3/1992 | Stroud et al. |
| 5,129,231 A | 7/1992 | Becker et al. |
| 5,252,026 A | 10/1993 | Shepard |
| 5,326,224 A | 7/1994 | Lee et al. |
| 5,358,374 A | 10/1994 | Correia et al. |
| 5,382,133 A | 1/1995 | Moore et al. |
| 5,418,345 A | 5/1995 | Adamski |
| 5,419,681 A | 5/1995 | Lee |
| 5,609,779 A | 3/1997 | Crow et al. |
| 5,651,662 A | 7/1997 | Lee et al. |
| 5,660,525 A | 8/1997 | Lee et al. |
| 5,683,600 A | 11/1997 | Kelley et al. |
| 5,813,836 A | 9/1998 | Starkweather |
| 6,139,258 A | 10/2000 | Lang, III et al. |
| 6,183,199 B1 | 2/2001 | Beeck et al. |
| 6,241,468 B1 | 6/2001 | Lock et al. |
| 6,243,948 B1 | 6/2001 | Lee et al. |
| 6,267,552 B1 * | 7/2001 | Weigand ............ F01D 5/186 415/115 |
| 6,287,075 B1 | 9/2001 | Kercher |
| 6,307,175 B1 | 10/2001 | Blochlinger et al. |
| 6,494,678 B1 | 12/2002 | Bunker |
| 6,547,524 B2 | 4/2003 | Kohli et al. |
| 6,572,335 B2 | 6/2003 | Kuwabara et al. |
| 6,744,010 B1 | 6/2004 | Pepe et al. |
| 6,923,247 B1 | 8/2005 | Ferber et al. |
| 6,944,580 B1 | 9/2005 | Blume et al. |
| 6,973,419 B1 | 12/2005 | Fortin et al. |
| 6,979,176 B2 | 12/2005 | Nakamata et al. |
| 7,186,085 B2 | 3/2007 | Lee |
| 7,273,351 B2 | 9/2007 | Kopmels |
| 7,328,580 B2 | 2/2008 | Lee et al. |
| 7,374,401 B2 | 5/2008 | Lee et al. |
| 7,578,653 B2 | 8/2009 | Klasing et al. |
| 7,726,131 B2 | 6/2010 | Sze et al. |
| 7,766,609 B1 | 8/2010 | Liang |
| 7,887,294 B1 | 2/2011 | Liang |
| 7,997,868 B1 | 8/2011 | Liang |
| 8,038,399 B1 | 10/2011 | Liang |
| 8,057,181 B1 | 11/2011 | Liang |
| 8,529,193 B2 * | 9/2013 | Venkataramanan .... F01D 5/186 415/115 |
| 2001/0036401 A1 | 11/2001 | Harvey et al. |
| 2002/0159888 A1 | 10/2002 | Rinck et al. |
| 2005/0106020 A1 | 5/2005 | Bunker et al. |
| 2008/0003096 A1 | 1/2008 | Kohi et al. |
| 2008/0031783 A1 | 2/2008 | Lee |
| 2008/0145208 A1 | 6/2008 | Kiasing et al. |
| 2009/0013695 A1 | 1/2009 | Dierberger et al. |
| 2009/0304499 A1 | 12/2009 | Strock et al. |
| 2010/0068032 A1 | 3/2010 | Liang |
| 2010/0068068 A1 | 3/2010 | Liang |
| 2010/0282721 A1 | 11/2010 | Bunker et al. |
| 2011/0097191 A1 | 4/2011 | Bunker |
| 2011/0123312 A1 * | 5/2011 | Venkataramanan .... F01D 5/186 415/115 |
| 2011/0185572 A1 | 8/2011 | Wei et al. |
| 2011/0293423 A1 | 12/2011 | Bunker et al. |
| 2011/0311369 A1 | 12/2011 | Ramachantran et al. |
| 2012/0051941 A1 | 3/2012 | Bunker |
| 2012/0167389 A1 | 7/2012 | Lacy et al. |

FOREIGN PATENT DOCUMENTS

| | | |
|---|---|---|
| EP | 2343435 A1 | 7/2011 |
| JP | 2001012204 A | 1/2001 |

OTHER PUBLICATIONS

Je-Chin Han et al., "Gas Turbine Heat Transfer and Cooling Technology," 2000, pp. GE-1008.001-GE-1008.159, Taylor & Francis, New York.

Ronald S. Bunker, "A Review of Shaped Hole Turbine Film-Cooling Technology," Journal of Heat Transfer, Apr. 2005, vol. 127, pp. GE-1010.001-GE1010.013.

Kusterer, K. et al., "The Nekomimi Cooling Technology: Cooling Holes with Ears for High-Efficient Film Cooling," Proceedings of ASME Turbo Expo 2011, Jun. 6-10, 2011, 11 pages.

John Eaton, Ph.D., "In the United States Patent and Trademark Office before the Patent Trial and Appeal Board," Declaration of John Eaton, Ph. D., Jul. 9, 2012, pp. GE-1003.001-GE1003.087, United States.

* cited by examiner

GAS TURBINE ENGINE COMPONENT WITH DIFFUSIVE COOLING HOLE

CROSS REFERENCE TO RELATED APPLICATION

This application is a continuation of U.S. application Ser. No. 13/544,153 filed Jul. 9, 2012 for "GAS TURBINE ENGINE COMPONENT WITH DIFFUSIVE COOLING HOLE" by JinQuan Xu, which in turn claims the benefit of U.S. Provisional Application No. 61/599,242 filed Feb. 15, 2012 for "GAS TURBINE ENGINE COMPONENT WITH DIFFUSIVE COOLING HOLE" by JinQuan Xu.

BACKGROUND

This invention relates generally to turbomachinery, and specifically to turbine flow path components for gas turbine engines. In particular, the invention relates to cooling techniques for airfoils and other gas turbine engine components exposed to hot working fluid flow, including, but not limited to, rotor blades and stator vane airfoils, endwall surfaces including platforms, shrouds and compressor and turbine casings, combustor liners, turbine exhaust assemblies, thrust augmentors and exhaust nozzles.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Industrial gas turbines often utilize complex nested spool configurations, and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains and armored vehicles, and in smaller-scale applications such as auxiliary power units.

Aviation applications include turbojet, turbofan, turboprop and turboshaft engine designs. In turbojet engines, thrust is generated primarily from the exhaust. Modern fixed-wing aircraft generally employ turbofan and turboprop configurations, in which the low pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines also known, in a variety of single-rotor and contra-rotating designs with both forward and aft mounting configurations.

Aviation turbines generally utilize two and three-spool configurations, with a corresponding number of coaxially rotating turbine and compressor sections. In two-spool designs, the high pressure turbine drives a high pressure compressor, forming the high pressure spool or high spool. The low-pressure turbine drives the low spool and fan section, or a shaft for a rotor or propeller. In three-spool engines, there is also an intermediate pressure spool. Aviation turbines are also used to power auxiliary devices including electrical generators, hydraulic pumps and elements of the environmental control system, for example using bleed air from the compressor or via an accessory gearbox.

Additional turbine engine applications and turbine engine types include intercooled, regenerated or recuperated and variable cycle gas turbine engines, and combinations thereof. In particular, these applications include intercooled turbine engines, for example with a relatively higher pressure ratio, regenerated or recuperated gas turbine engines, for example with a relatively lower pressure ratio or for smaller-scale applications, and variable cycle gas turbine engines, for example for operation under a range of flight conditions including subsonic, transonic and supersonic speeds. Combined intercooled and regenerated/recuperated engines are also known, in a variety of spool configurations with traditional and variable cycle modes of operation.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans produce proportionally more thrust from the exhaust flow, generating greater specific thrust for use in high-performance applications including supersonic jet aircraft. Low bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures.

SUMMARY

A component for a gas turbine engine includes a gas path wall having a first surface, a second surface exposed to hot gas flow, and a cooling hole extending through the gas path wall. The cooling hole includes an inlet formed in the first surface, an outlet formed in the second surface, cooling hole surfaces that define the cooling hole between the inlet and the outlet, and a longitudinal ridge formed along at least one of the cooling hole surfaces. The longitudinal ridge separates the cooling hole into first and second lobes. The cooling hole diverges through the gas path wall, such that cross-sectional area of the cooling hole increases continuously from the inlet through the cooling hole to the outlet.

Another embodiment of the present invention is an airfoil including a flow path wall having a first surface exposed to cooling fluid and a second surface exposed to hot gas flow. A cooling hole is formed in the flow path wall and is laterally diverging continuously from an inlet at the first surface to an outlet at the second surface. A longitudinal ridge is defined along the cooling hole and divides the cooling hole into first and second lobes. Flow of the cooling fluid is substantially diffusive through the cooling hole, from the inlet at the first surface of the flow path wall through to the outlet at the second surface of the flow path wall.

Another embodiment of the present invention is a gas turbine engine component including a gas path wall, a cooling hole extending through the gas path wall, and a longitudinal ridge extending along the cooling hole. The gas path wall has a first surface and a second surface exposed to hot gas flow. The cooling hole is continuously diverging from an inlet in the first surface to an outlet in the second surface. The longitudinal ridge divides the cooling hole into first and second lobes.

DETAILED DESCRIPTION

Figure 1:
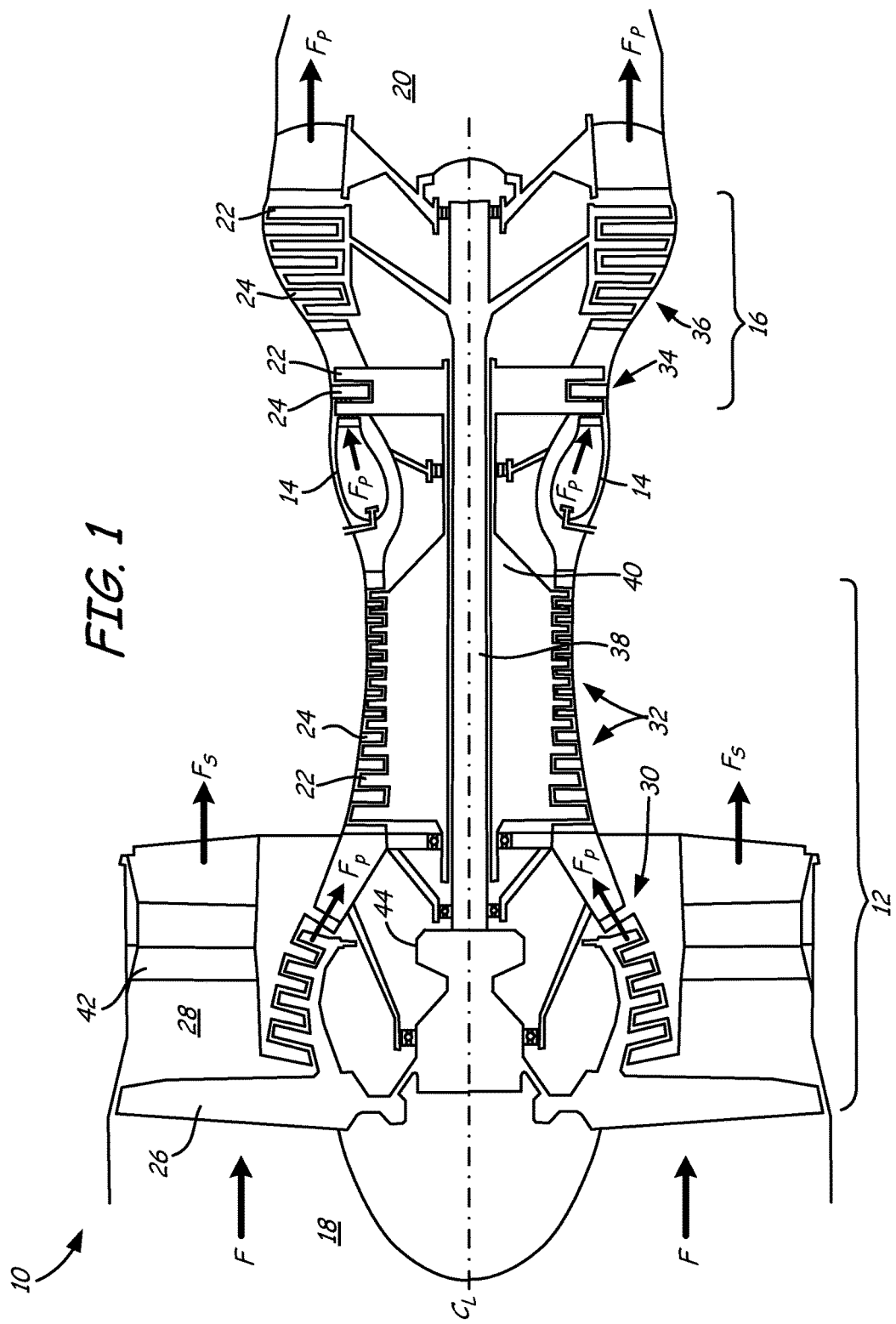
FIG. 1 is a cross-sectional view of a gas turbine engine.

FIG. 1 is a cross-sectional view of gas turbine engine 10. Gas turbine engine (or turbine engine) 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage 26 may also provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

For improved service life and reliability, components of gas turbine engine 10 are provided with an improved cooling configuration, as described below. Suitable components for the cooling configuration include rotor airfoils 22, stator airfoils 24 and other gas turbine engine components exposed to hot gas flow, including, but not limited to, platforms, shrouds, casings and other endwall surfaces in hot sections of compressor 12 and turbine 16, and liners, nozzles, afterburners, augmentors and other gas wall components in combustor 14 and exhaust section 20.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow $F_P$ and secondary (bypass) flow $F_S$ downstream of fan rotor 26. Fan rotor 26 accelerates secondary flow $F_S$ through bypass duct 28, with fan exit guide vanes (FEGVs) 42 to reduce swirl and improve thrust performance. In some designs, structural guide vanes (SGVs) 42 are used, providing combined flow turning and load bearing capabilities.

Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor (or other propulsion stage) 26 is rotationally coupled to low pressure shaft 38. In advanced designs, fan drive gear system 44 is provided for additional fan speed control, improving thrust performance and efficiency with reduced noise output.

Fan rotor 26 may also function as a first-stage compressor for gas turbine engine 10, and LPC 30 may be configured as an intermediate compressor or booster. Alternatively, propulsion stage 26 has an open rotor design, or is absent, as described above. Gas turbine engine 10 thus encompasses a wide range of different shaft, spool and turbine engine configurations, including one, two and three-spool turboprop and (high or low bypass) turbofan engines, turboshaft engines, turbojet engines, and multi-spool industrial gas turbines.

In each of these applications, turbine efficiency and performance depend on the overall pressure ratio, defined by the total pressure at inlet 18 as compared to the exit pressure of compressor section 12, for example at the outlet of high pressure compressor 32, entering combustor 14. Higher pressure ratios, however, also result in greater gas path temperatures, increasing the cooling loads on rotor airfoils 22, stator airfoils 24 and other components of gas turbine engine 10. To reduce operating temperatures, increase service life and maintain engine efficiency, these components are provided with improved cooling configurations, as described below. Suitable components include, but are not limited to, cooled gas turbine engine components in compressor sections 30 and 32, combustor 14, turbine sections 34 and 36, and exhaust section 20 of gas turbine engine 10.

Figure 2A:
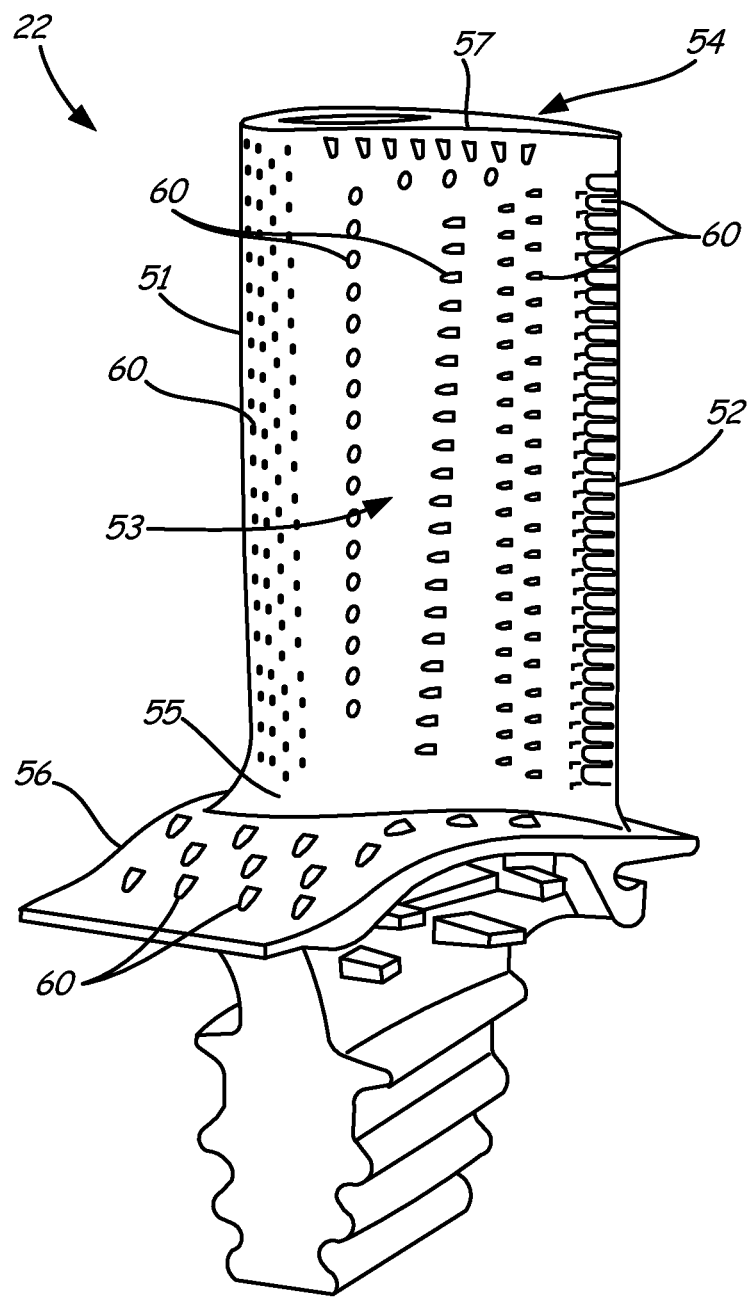
FIG. 2A is a perspective view of an airfoil for the gas turbine engine, in a rotor blade configuration.

FIG. 2A is a perspective view of rotor airfoil (or blade) 22 for gas turbine engine 10, as shown in FIG. 1, or for another turbomachine. Rotor airfoil 22 extends axially from leading edge 51 to trailing edge 52, defining pressure surface 53 (front) and suction surface 54 (back) therebetween.

Pressure and suction surfaces 53 and 54 form the major opposing surfaces or walls of airfoil 22, extending axially between leading edge 51 and trailing edge 52, and radially from root section 55, adjacent inner diameter (ID) platform 56, to tip section 57, opposite ID platform 56. In some designs, tip section 57 is shrouded.

Cooling holes or outlets 60 are provided on one or more surfaces of airfoil 22, for example along leading edge 51, trailing edge 52, pressure (or concave) surface 53, or suction (or convex) surface 54, or a combination thereof. Cooling holes or passages 60 may also be provided on the endwall surfaces of airfoil 22, for example along ID platform 56, or on a shroud or engine casing adjacent tip section 57.

Figure 2B:
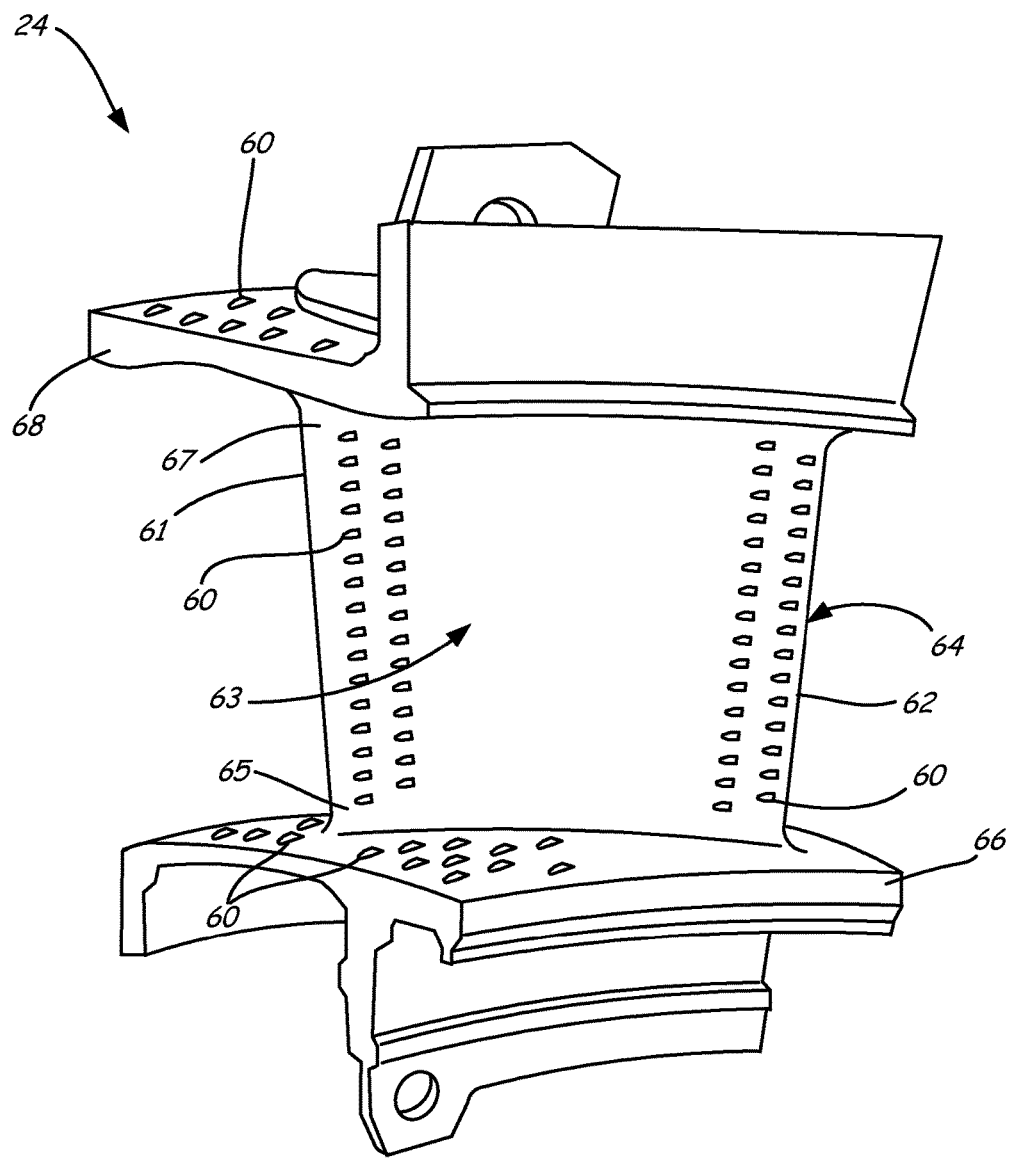
FIG. 2B is a perspective view of an airfoil for the gas turbine engine, in a stator vane configuration.

FIG. 2B is a perspective view of stator airfoil (or vane) 24 for gas turbine engine 10, as shown in FIG. 1, or for another turbomachine. Stator airfoil 24 extends axially from leading edge 61 to trailing edge 62, defining pressure surface 63 (front) and suction surface 64 (back) therebetween. Pressure and suction surfaces 63 and 64 extend from inner (or root) section 65, adjacent ID platform 66, to outer (or tip) section 67, adjacent outer diameter (OD) platform 68.

Cooling holes or outlets 60 are provided along one or more surfaces of airfoil 24, for example leading or trailing edge 61 or 62, pressure (concave) or suction (convex) surface 63 or 64, or a combination thereof. Cooling holes or passages 60 may also be provided on the endwall surfaces of airfoil 24, for example along ID platform 66 and OD platform 68.

Rotor airfoils 22 (FIG. 2A) and stator airfoils 24 (FIG. 2B) are formed of high strength, heat resistant materials such as high temperature alloys and superalloys, and are provided with thermal and erosion-resistant coatings. Airfoils 22 and 24 are also provided with internal cooling holes and cooling holes 60 to reduce thermal fatigue and wear, and to prevent melting when exposed to hot gas flow in the higher temperature regions of a gas turbine engine or other turbomachine. Cooling holes 60 deliver cooling fluid (e.g., steam or air from a compressor) through the outer walls and platform structures of airfoils 22 and 24, creating a thin layer (or film) of cooling fluid to protect the outer (gas path) surfaces from high temperature flow.

While surface cooling extends service life and increases reliability, injecting cooling fluid into the gas path also reduces engine efficiency, and the cost in efficiency increases with the required cooling flow. Cooling holes 60 are thus provided with improved metering and inlet geometry to reduce jets and blow off, and improved diffusion and exit geometry to reduce flow separation and corner effects. Cooling holes 60 reduce flow requirements and improve the spread of cooling fluid across the hot surfaces of airfoils 22 and 24, and other gas turbine engine components, so that less flow is needed for cooling and efficiency is maintained or increased.

Figure 3A:
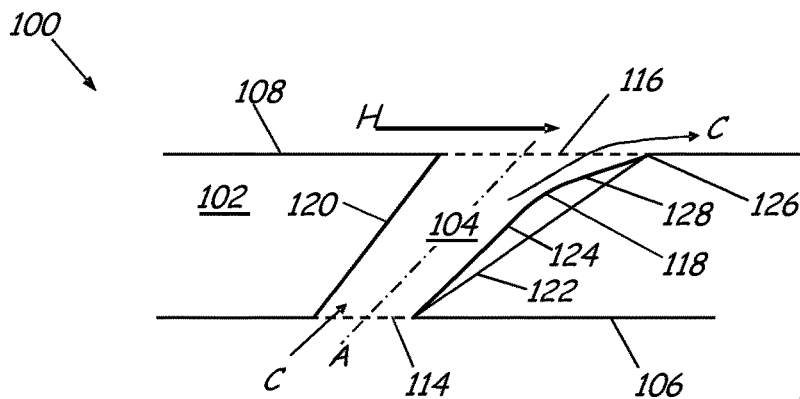
FIG. 3A is a cross-sectional view of the gas path wall for a cooled gas turbine engine component, taken in a longitudinal direction.

FIG. 3A is a cross-sectional view of gas turbine engine component (turbine or turbomachinery component) 100 with gas path wall 102, taken in a longitudinal direction and that carries a cool first surface 106 and an opposite, hot, second surface 108. Cooling hole 104 extends through gas path wall 102 from first surface 106 to second surface 108 form cooling hole 60 in the, for example outer wall of an airfoil, casing, combustor liner, exhaust nozzle or other gas turbine engine component, as described above.

Gas path wall 102 of component 100 is exposed to cooling fluid on first surface 106 with longitudinal hot gas or working fluid flow H along second surface 108. In some components, for example airfoils, first surface 106 is an inner surface (or inner wall) and second surface 108 is an outer surface (or outer wall). In other components, for example combustor liners and exhaust nozzles, first surface 106 is an outer surface (or outer wall), and second surface 108 is an inner surface (or inner wall). More generally, the terms inner and outer are merely representative, and may be interchanged.

Cooling hole 104 delivers cooling fluid C from first surface 106 of wall 102 to second surface 108, for example to provide diffusive flow and film cooling. Cooling hole 104 is also inclined along axis A in a downstream direction, in order to improve cooling fluid coverage over second surface 108, with less separation and reduced flow mixing. Longitudinal ridge 124 is provided to reduce flow swirl and flow vortex at outlet 116. Outlet 116 defines a perimeter of cooling hole 104 at an intersection of cooling hole 104 and second surface 108. Surfaces 120, 122, 130, and 132 of cooling hole 104 define cooling hole 104 between inlet 114 and outlet 116.

As shown in FIG. 3A, cooling hole 104 extends along axis A from inlet 114 at first surface 106 of gas path wall 102 to outlet 116 at second surface 108. In one embodiment, cooling hole 104 is continuously divergent throughout, with continuously increasing cross section or flow area from inlet 114 through cooling hole 104 to outlet 116. Thus, cooling hole 104 has substantially no convergent or constant-area metering portion between inlet 114 and outlet 116, nor any transition between such a convergent or constant-area metering portion and a diffusion portion. Instead, regulation of cooling flow C is provided by inlet 114, or other geometrical feature at first surface 106, and flow is diffusive through cooling hole 104 over substantially the entire length from inlet 114 at first surface 106 to outlet 116 at second surface 108.

That is, cooling hole 104 is substantially diffusive (or divergent) between inlet 114 and outlet 116, and from first surface 106 to second surface 108 of gas path wall 102. As shown in FIG. 3A, for example, upstream and downstream surfaces 120 and 122 of cooling hole 104 diverge continuously along axis A between inlet 114 and outlet 116. In particular, upstream surface 120 and downstream surface 122 diverge away from one another in the longitudinal direction, as defined along hot gas flow H. This increases the cross sectional area (or flow area) of cooling hole 104, providing diffusive flow to increase the coverage of cooling fluid C along second surface 108 of gas path wall 102. In another embodiment, upstream surface 120 and downstream surface 122 cooling hole 104 can converge in the longitudinal direction, and lateral surfaces 130 and 132 (shown in FIGS. 4A, 4B, 5A, 5B, 6A, 6B, 7A, and 7B) of cooling hole 104 can diverge in the lateral direction.

Longitudinal ridge 124 is formed as a ridge or rib structure along downstream surface 122 of cooling hole 104. In this particular configuration shown in FIG. 3A, longitudinal ridge 124 extends from inlet 114 to outlet 116, in order to reduce swirl components over substantially the entire length of cooling hole 104. Alternatively, longitudinal ridge 124 is truncated between inlet 114 and outlet 116 (shown in FIG. 3B), or longitudinal ridge 124 extends along cooling hole 104 to form a cusp at inlet 114 on inner surface 106 (shown in FIG. 3C), as described in more detail below.

Longitudinal ridge 124 projects laterally outward from downstream surface 122 toward axis A, separating cooling hole 104 into lobes to discourage swirl flow and reduce flow mixing at outlet 116. Longitudinal ridge 124 may also include transition region 128, extending from ridge transition 118 to trailing edge 126 of outlet 116, as described below (see, e.g., FIGS. 4B, 5A, 5B, 6A, 6B, 7A, 7B). Ridge transition 118 is a location where longitudinal ridge 124 meets transition region 128. In the embodiment illustrated in FIG. 3A, ridge transition 118 has a curved cross-sectional profile. In alternative embodiments (such as FIGS. 3A and 3B), ridge transition 118 can have a pointed cross-sectional profile. Transition region 128 may be flat/planar, or convex to encourage flow attachment and reduce flow separation or mixing along second surface 108 of gas path wall 102.

Figure 3B:
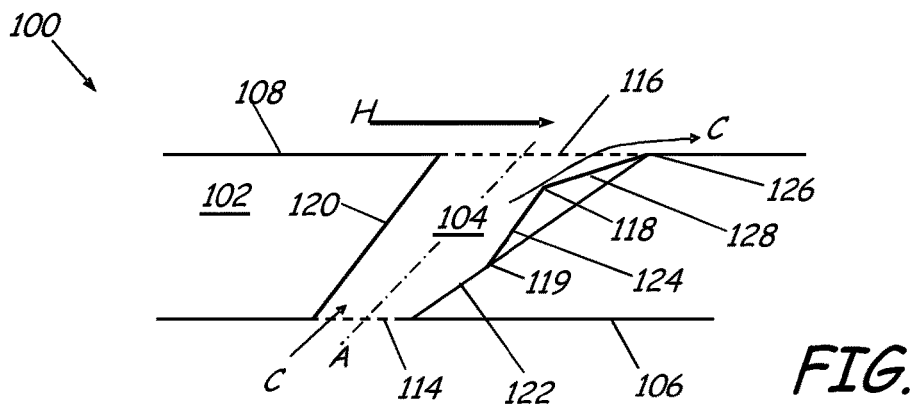
FIG. 3B is a cross-sectional view of the gas path wall, showing a truncated lobe configuration.

FIG. 3B is a cross-sectional view of gas turbine engine component 100 with gas path wall 102, showing cooling hole 104 with longitudinal ridge 124 in a truncated configuration. In this configuration, longitudinal ridge 124 extends from ridge terminus 119 to ridge transition 118. Ridge terminus 119 is a point where longitudinal ridge 124 meets downstream surface 122. Ridge terminus 119 is spaced between inlet 114 and outlet 116. This truncated configuration provides diffusive flow from inlet 114 through ridge terminus 119 to outlet 116, discourages swirl flow from ridge terminus 119 through outlet 116, and minimizes flow mixing at the second surface 108 downstream of outlet 116.

Figure 3C:
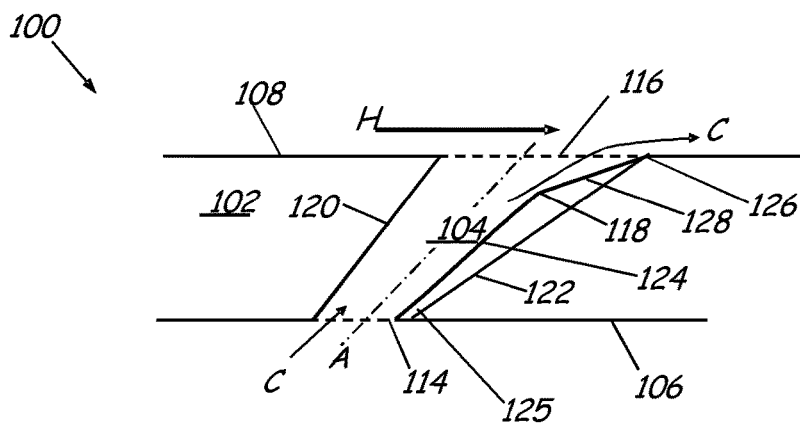
FIG. 3C is a cross-sectional view of the gas path wall, showing a cusped inlet configuration.

FIG. 3C is a cross-sectional view of gas turbine engine component 100 with gas path wall 102, showing cooling hole 104 with a cusped configuration at inlet 114. In this configuration, longitudinal ridge 124 projects laterally outward (toward axis A) from downstream surface 122 at first surface 106 of gas path wall 102, forming a cusp 125 on inlet 11. In this particular configuration, cusp 125 extends congruently with longitudinal ridge 124 along cooling hole 104, from inlet 114 toward outlet 116.

The cross-sectional geometry of cooling hole 104 also varies, as described above, and as shown in the figures. The design of cooling hole 104 is not limited to these particular examples, however, but also encompasses different combinations and variations of the features that are described, including different features for longitudinal ridge 124, ridge transition 118, ridge terminus 119, and transition region 128.

Figure 4A:
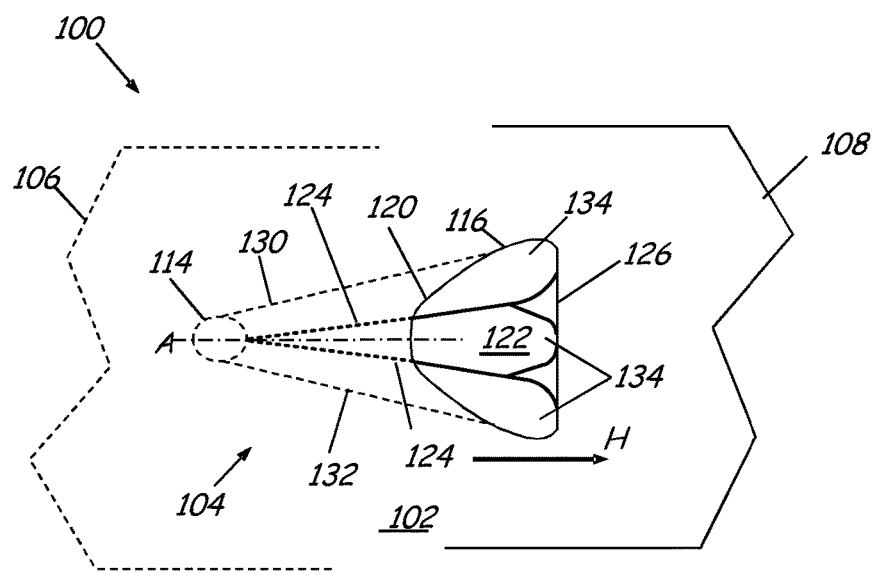
FIG. 4A is a schematic view of the gas path wall, with a three-lobe cooling hole geometry.

FIG. 4A is a schematic view of gas turbine engine component 100 with gas path wall 102, illustrating a three-lobe geometry for cooling hole 104. Cooling hole 104 extends from inlet 114 on first surface 106 (dashed line) of gas path wall 102 to outlet 116 on second surface 108 (solid line). Second surface 108 is exposed to hot gas flow H in a downstream longitudinal direction, as described above.

Lateral (side) surfaces 130 and 132 of cooling hole 104 diverge continuously along axis A, from inlet 114 at first surface 106 to outlet 116 at second surface 108. In particular, side surfaces 130 and 132 diverge in a lateral direction, transverse or perpendicular to hot gas flow H, increasing the cross sectional flow area of cooling hole 104 to provide diffusive flow along substantially the entire passage length between inlet 114 and outlet 116.

Longitudinal ridges 124 separate cooling hole 104 into lobes 134. For example, two ridges 124 may extend along downstream surface 122 to divide cooling hole 104 into three lobes 134, as shown in FIG. 4A. Lobes 134 are surfaces of wall 102 which define distinct channel-like portions of the void of cooling hole 104. Longitudinal ridges 124 project out (upward) from downstream surface 122 toward axis A to discourage transverse flow components and swirl, reducing flow separation and minimizing flow mixing at the second surface 108 downstream of outlet 116.

The geometry of outlet 116 is also selected to improve cooling performance, including the geometry of trailing edge 126. In particular, outlet 116 may be formed as a delta with arcuate upstream surface 120 and substantially straight trailing edge 126, transverse to hot gas flow H. Alternatively, the delta may be configured with a more or less convex trailing edge 126, having a central portion extending downstream along second surface 108 (see FIG. 4B). These configurations further reduce flow separation and increase attachment and laminar flow, for improved coverage and cooling efficiency along second surface 108 of gas path wall 102.

Figure 4B:
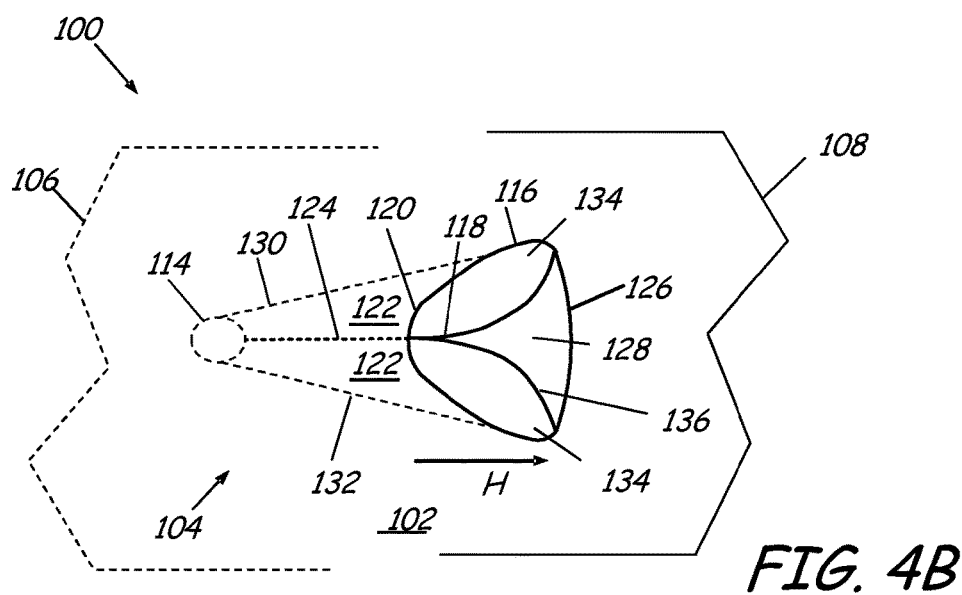
FIG. 4B is a schematic view of the gas path wall, with a two-lobe cooling hole geometry.

FIG. 4B is a schematic view of gas turbine engine component 100 with gas path wall 102, illustrating a two-lobe geometry for cooling hole 104. In this configuration, a single longitudinal ridge 124 divides cooling hole 104 into two lobes 134, and outlet 116 has a delta configuration with arcuate upstream surface 120 extending toward convex trailing edge 126.

As shown in FIG. 4B, longitudinal ridge 124 extends from inlet 114 to ridge transition 118, and transition region 128 extends from ridge transition 118 to trailing edge 126 of outlet 116. For example, longitudinal ridge 124 may be formed at the intersection or interface between adjacent lobes 134, where lobes 134 have arcuate or curved surfaces along downstream surface 122, meeting at a cusped or convex longitudinal ridge 124. Alternatively, longitudinal ridge 124 may be formed at the intersection or interface between adjacent lobes 134 with substantially planar surfaces along downstream surface 122, meeting at a triangular longitudinal ridge 124.

Transition region 128 is defined between arcuate extensions 136 of longitudinal ridge 124. In the particular configuration of FIG. 4B, for example, two arcuate extensions 136 form at ridge transition 118 of longitudinal ridge 124, extending longitudinally and transversely from ridge transition 118 to trailing edge 126 of outlet 116. Transition region 128 can be flat or planar. Alternatively, transition region 128 can be non-flat and non-planar, such as curved (e.g. convex) longitudinally and/or laterally.

Transition region 128 extends transversely along substantially the entire length of trailing edge 126, between arcuate extensions 136. Alternatively, two or more transition regions 128 extend along trailing edge 126, as defined between three or more lobes 134 (see, e.g., FIG. 5A), or a trapezoidal region is provided (FIG. 7B). In each of these configurations, one or more transition regions 128 extend along substantially all of trailing edge 126, eliminating cusps and other irregularities along trailing edge 126 to encourage attachment and reduce separation for more uniform coverage and higher cooling efficiency. Transition region 128 can further encourage attachment and reduce separation when transition region 128 is convex.

Figure 5A:
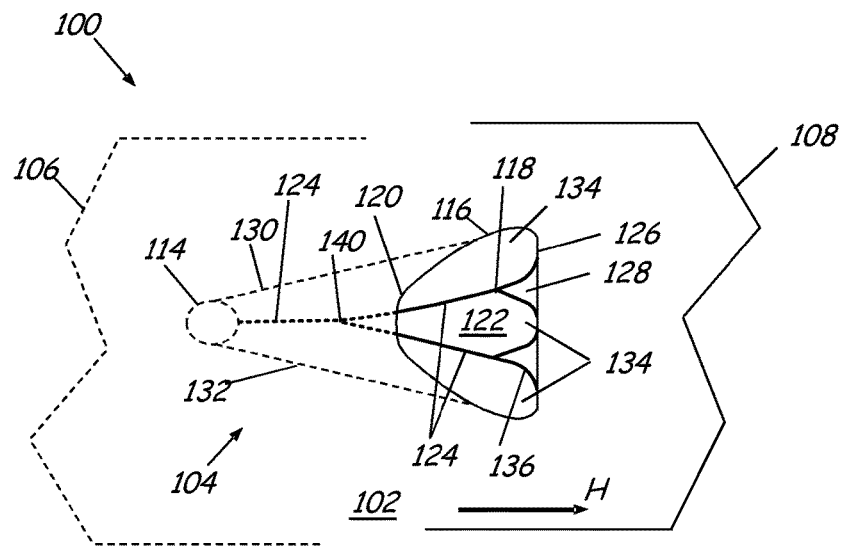
FIG. 5A is a schematic view of the gas path wall, with a truncated lobe cooling hole geometry.

FIG. 5A is a schematic view of gas turbine engine component 100 with gas path wall 102, illustrating a truncated lobe geometry for cooling hole 104. In this configuration, two longitudinal ridges 124 separate cooling hole 104 into three lobes 134 in the region of outlet 116. Lobes 134 extend along cooling hole 104 toward inlet 114, as described above with respect to FIG. 4A.

As shown in FIG. 5A, however, longitudinal ridges 124 merge at ridge nexus 140, between (circular, oval or elliptical) inlet 114 and (delta-shaped) outlet 116. A single longitudinal ridge 124 then extends from ridge nexus 140 to inlet 114, dividing cooling hole 104 into two lobes in this region.

Considered in the direction of cooling fluid flow, a single longitudinal ridge 124 separates cooling hole 104 into two lobes 134 in the region from inlet 114 to ridge nexus 140. Longitudinal ridge 124 splits or bifurcates at ridge nexus 140, dividing cooling hole 104 into three lobes 134 in the region from ridge nexus 140 to outlet 116. Thus, two longitudinal ridges 124 extend from ridge nexus 140 to two transitions 118, with two transition regions 128 extending from transitions 118 to trailing edge 126 of cooling hole 104. Transition regions 128 are defined between adjacent lobes 134 by arcuate extensions 136, as described above.

Figure 5B:
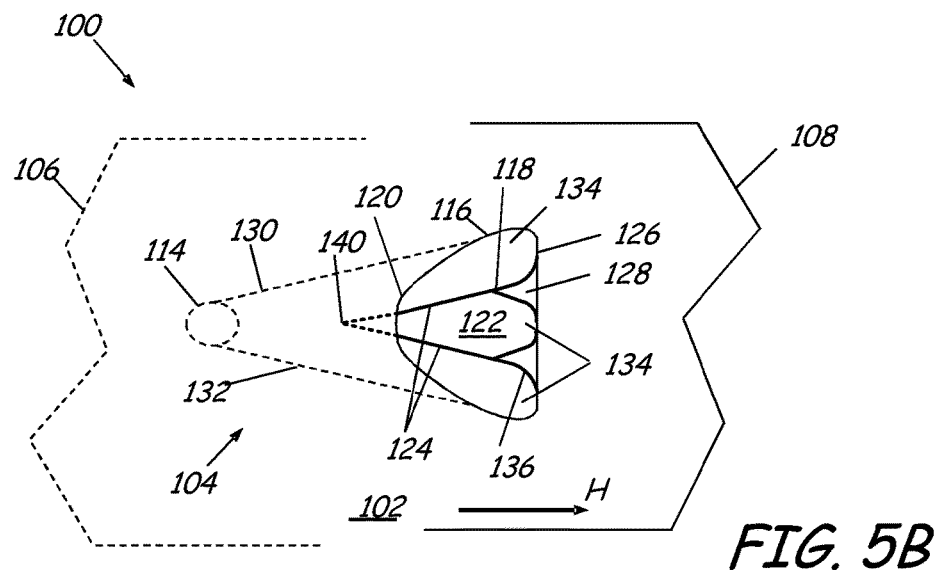
FIG. 5B is a schematic view of the gas path wall, with an alternate truncated lobe cooling hole geometry.

FIG. 5B is a schematic view of gas turbine engine component 100 with gas path wall 102, illustrating an alternate truncated lobe geometry for cooling hole 104. In this configuration, both longitudinal ridges 124 terminate at ridge nexus 140, and no longitudinal ridge 124 extends between inlet 114 and ridge nexus 140. Thus, cooling hole 104 has a single-lobe configuration from inlet 114 to ridge nexus 140, and a three-lobe configuration from ridge nexus 140 to outlet 116.

Figure 6A:
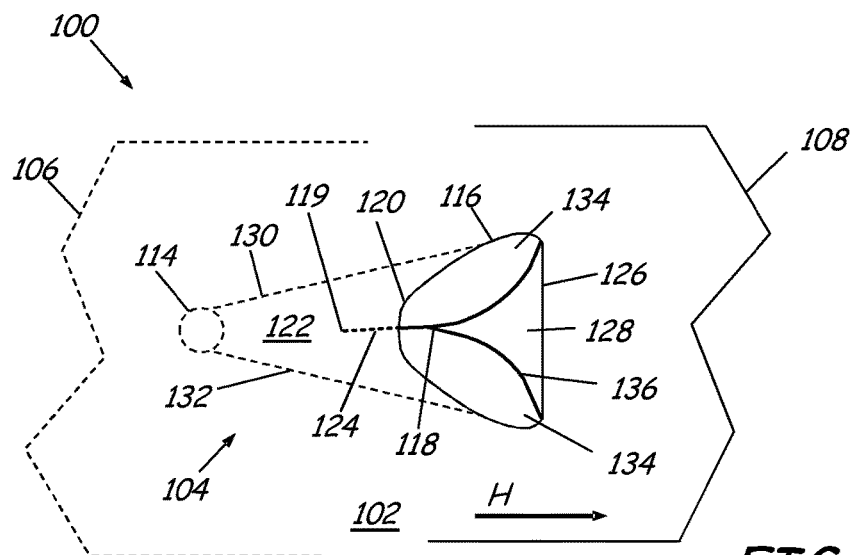
FIG. 6A is a schematic view of the gas path wall, with a truncated two-lobe cooling hole geometry.

FIG. 6A is a schematic view of gas turbine engine component 100 with gas path wall 102, illustrating a truncated two-lobe geometry for cooling hole 104. In this configuration, longitudinal ridge 124 is not present between (circular) inlet 114 and ridge terminus 119. Instead, longitudinal ridge 124 separates cooling hole 104 into two lobes 134 in the region of outlet 116, extending from ridge terminus 119 to ridge transition 118. Arcuate extensions 136 define a single transition region 128, extending between adjacent lobes 134 from ridge transition 118 to trailing edge 126 of outlet 116.

Figure 6B:
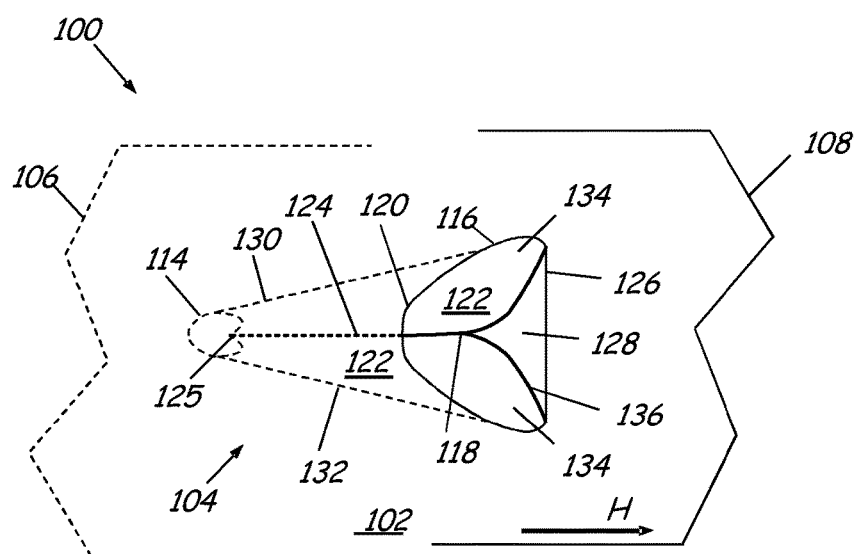
FIG. 6B is a schematic view of the gas path wall, with a cusped inlet cooling hole geometry.

FIG. 6B is a schematic view of gas turbine engine component 100 with gas path wall 102, illustrating a cusped inlet geometry for cooling hole 104. Cusp 125 discourages swirl and vortex formation, and may further restrict the area of inlet 114 to provide additional flow metering.

In this particular configuration, a single longitudinal ridge 124 separates cooling hole 104 into two lobes 134, extending from ridge transition 118 to inlet 114 so as to define cusp 125 on inlet 114, at first surface 106 of gas path wall 102. Cusp 125 thus extends congruently with longitudinal ridge 124, from inlet 114 to ridge transition 118 along downstream surface 122 of cooling hole 104. Arcuate extensions 136 extend from ridge transition 118 to trailing edge 126 of cooling hole 104, defining transition region 128 between adjacent lobes 134.

Like ridge 124, cusp 125 projects laterally away from downstream surface 122 toward the axis of cooling hole 104 (see FIG. 3C), discouraging transverse flow components to reduce swirl along cooling hole 104, with less flow mixing at outlet 116 and second surface 108 downstream. Cusp 125 also restricts the area of inlet 114, reducing flow vortex and improving coverage as described above. In continuously diverging designs of cooling hole 104, where flow is diffusive through substantially the entire length of cooling hole 104, cusp 125 provides additional control of flow metering, where metering is determined primarily by the size and geometry of inlet 114.

The geometries of longitudinal ridge 124 and cusp 125 vary, and the structures may be formed as extensions of one another, or distinct. For example, one or both of ridge 124 and cusp 125 may be formed as long, narrow features extending along the wall of cooling hole 104 where two sloping sides of lobes 134 meet, or as a narrow raised band or rib structure between adjacent lobes 134. Ridge 124 and cusp 125 may also be either substantially pointed or rounded where two curved lobes 134 or wall surfaces meet, or where the direction of curvature reverses along a wall of cooling hole 104. Ridge 124 and cusp 125 may also be formed as arched or cone-shape features extending along the boundary of two lobes 134.

Figure 7A:
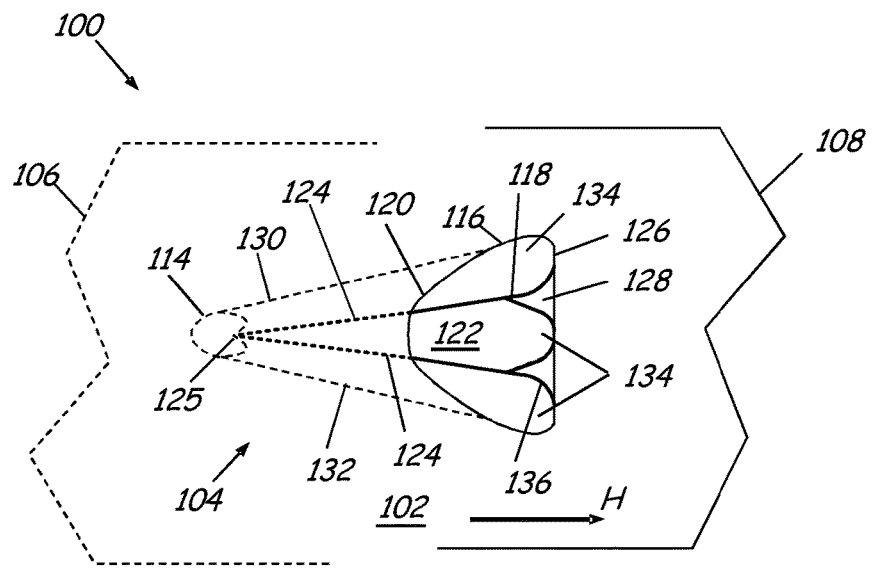
FIG. 7A is a schematic view of the gas path wall, with a three-lobe cusped inlet cooling hole geometry.
Figure 7B:
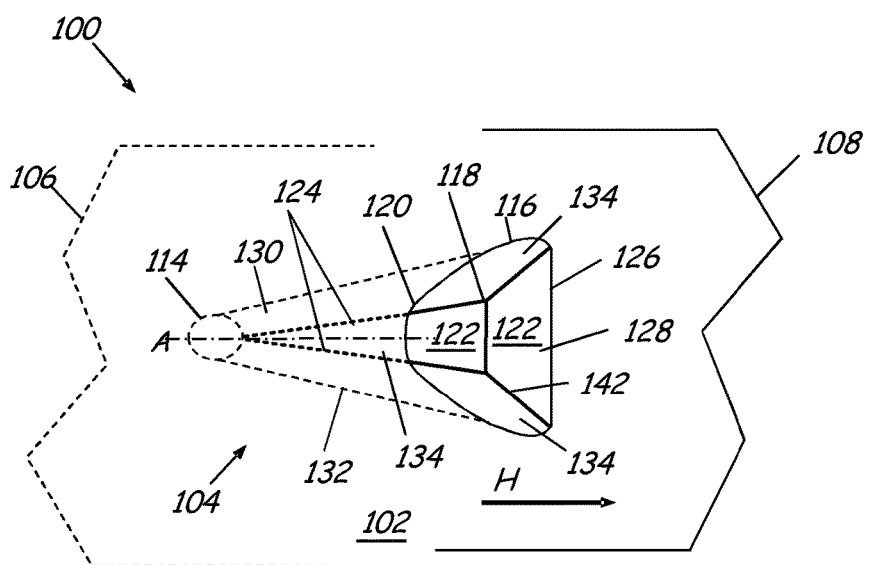
FIG. 7B is a schematic view of the gas path wall, with a buried divider cooling hole geometry.

FIG. 7A is a schematic view of gas turbine engine component 100 with gas path wall 102, illustrating an alternate cusped inlet geometry for cooling hole 104. In this configuration, two longitudinal ridges 124 extend from cusp 125 at inlet 114 to ridge transition 118, dividing cooling hole 104 into three lobes 134 along substantially the entire passage length.

FIG. 7B is a schematic view of gas turbine engine component 100 with gas path wall 102, illustrating a buried divider or buried ridge configuration for cooling hole 104. In this design, longitudinal ridges 124 extend from inlet 114, dividing cooling hole 104 into three lobes 134 between first surface 106 of gas path wall and ridge transition 118. As shown in FIG. 7B, however, middle lobe 134 terminates at transition region 128, where transition region 128 is bounded between intersections 142 with adjacent outer lobes 134.

Unlike arcuate extensions 136 of longitudinal ridges 124, intersections 142 do not extend above downstream surface 122 toward axis A of cooling hole 104. Instead, transition region 128 is congruent with downstream surface 122, and adjacent lobes 134 curve up from intersections 142 toward second (upper) surface 108 of gas path wall 102.

Figure 7C:
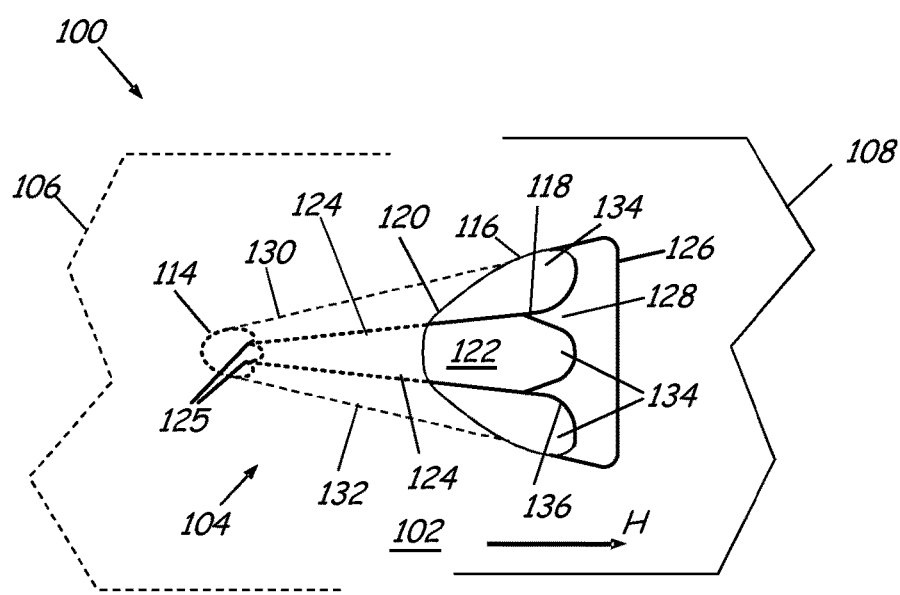
FIG. 7C is a schematic view of the gas path wall, with a three-lobe two-cusped inlet cooling hole geometry.

FIG. 7C is a schematic view of gas turbine engine component 100 with gas path wall 102, illustrating an alternate cusped inlet geometry for cooling hole 104. In this configuration, two longitudinal ridges 124 extend from two cusps 125 at inlet 114 to ridge transition 118, dividing cooling hole 104 into three lobes 134 along substantially the entire passage length. Thus, inlet 114 has a two-cusped configuration.

FIG. 7C also illustrates a single transition region 128 extending from longitudinal ridges 124 to trailing edge 126 of outlet 116. The boundary of transition region 128 and adjacent lobes 134 are defined along arcuate extensions 136. Transition region 128 extends across substantially all of trailing edge 126, eliminating irregularities to provide more uniform flow coverage and better cooling performance along second surface 108 of gas path wall 102, downstream of outlet 116. Transition region 128 separates lobes 134 from trailing edge 126 of outlet 116.

The overall geometry of cooling hole 104 thus varies, as described above, and as shown in the figures. The design of inlet 114 and outlet 116 may also vary, including various circular, oblate, oval, trapezoidal, triangular, cusped and delta shaped profiles with arcuate or piecewise linear upstream surfaces 120 extending toward straight or convex trailing edges 126. The configuration of cooling hole 104 is not limited to these particular examples, moreover, but also encompasses different combinations of the various features that are shown, including a variety of different cusps 125; transitions 118 with different circular, elliptical, oblong and cusped cross sections; and one, two or three lobes 134, in combination with different transition regions 128 bordered by various arcuate extensions 136 and intersections 142.

Figure 8:
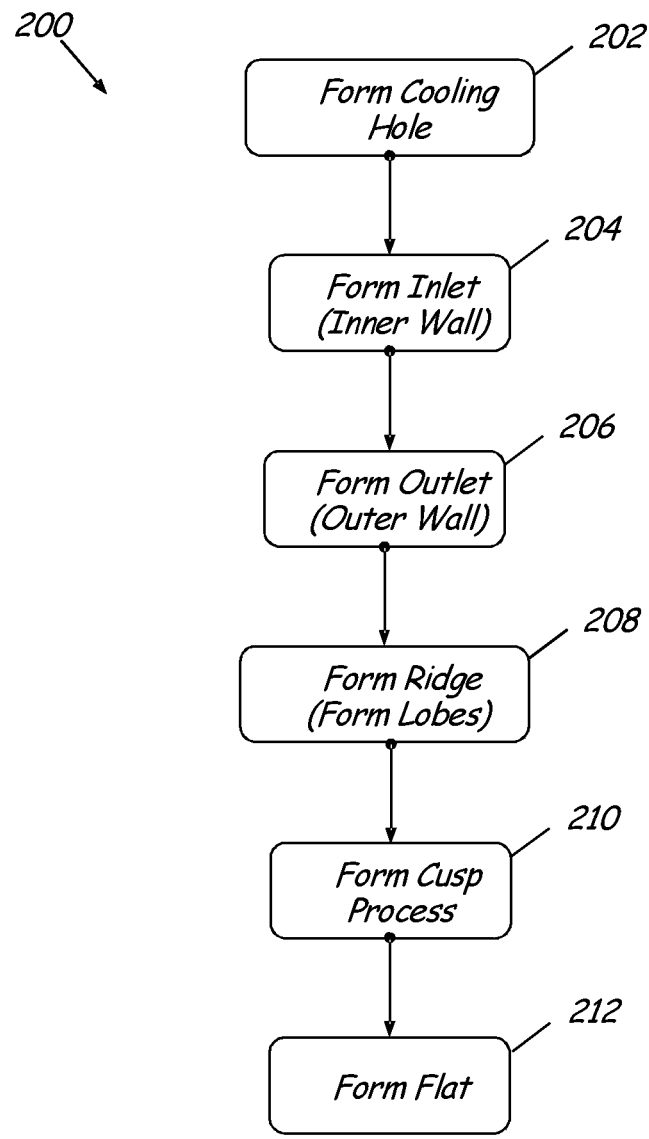
FIG. 8 is a block diagram of a method for forming a cooling hole in a gas turbine engine component.

FIG. 8 is a block diagram illustrating method 200 for forming a cooling hole through the flow path wall of a gas turbine engine component. For example, method 200 may be used to form cooling hole 60 or cooling hole 104 in the gas path wall of an airfoil, casing, liner, combustor, augmentor or turbine exhaust component of a gas turbine engine or other turbomachine, as described above.

Method 200 includes forming a cooling hole in a flow path wall of the component (step 202), for example by forming an inlet in the first (cool) surface of the wall (step 204), forming an outlet in the second (hot) surface of the wall (step 206), and forming lobes (step 208) between the inlet and the outlet.

The cooling hole extends along an axis from the inlet to the outlet, diverging continuously along the axis from the first surface to the second surface of the flow path wall. The cross-sectional or flow area of the cooling hole increases continuously from the inlet to the outlet, and flow is diffusive along substantially the entire length of the cooling hole, from the inlet through the cooling hole to the outlet.

Forming a ridge (step 208) comprises forming a longitudinal ridge along a downstream wall of the cooling hole. The longitudinal ridge divides the cooling hole into lobes, for example in the outlet region of the cooling hole. Where the longitudinal ridge extends to the inlet, it may be formed congruently with a cusp.

In some designs, forming the inlet (step 204) includes forming a cusp in the inlet (step 210), and in other designs a cusp may be formed along with the lobes (step 208). In additional designs, forming the outlet (step 206) may include forming a transition region (step 212). Where a transition region is formed, one or more of the lobes may terminate there.

The gas turbine engine components, gas path walls and cooling holes described herein can thus be manufactured using one or more of a variety of different processes. These techniques provide each cooling hole with its own particular configuration and features, including, but not limited to, inlet, metering, transition, diffusion, outlet, upstream surface, downstream surface, lateral surface, longitudinal, lobe and downstream edge features, as described above. In some cases, multiple techniques can be combined to improve overall cooling performance or reproducibility, or to reduce manufacturing costs.

Suitable manufacturing techniques for forming the cooling configurations described here include, but are not limited to, electrical discharge machining (EDM), laser drilling, laser machining, electrical chemical machining (ECM), water jet machining, casting, conventional machining and combinations thereof. Electrical discharge machining includes both machining using a shaped electrode as well as multiple pass methods using a hollow spindle or similar electrode component. Laser machining methods include, but are not limited to, material removal by ablation, trepanning and percussion laser machining. Conventional machining methods include, but are not limited to, milling, drilling and grinding.

The gas flow path walls and outer surfaces of some gas turbine engine components include one or more coatings, such as bond coats, thermal barrier coatings, abrasive coatings, abradable coatings and erosion or erosion-resistant coatings. For components having a coating, the inlet, transition, and outlet cooling features may be formed prior to a coating application, after a first coating (e.g., a bond coat) is applied, or after a second or third (e.g., interlayer) coating process, or a final coating (e.g., environmental or thermal barrier) process. Depending on component type, cooling hole or passage location, repair requirements and other considerations, the outlet features may be located within a wall or substrate, within a thermal barrier coating or other coating layer applied to a wall or substrate, or combinations thereof. The cooling geometry and other features may remain as described above, regardless of position relative to the wall and coating materials or airfoil materials.

While the invention is described with reference to exemplary embodiments, it will be understood by those skilled in the art that various changes may be made and equivalents may be substituted without departing from the spirit and scope of the invention. In addition, different modifications may be made to adapt the teachings of the invention to particular situations or materials, without departing from the essential scope thereof. The invention is thus not limited to the particular examples disclosed herein, but includes all embodiments falling within the scope of the appended claims.

Discussion of Possible Embodiments

The following are non-exclusive descriptions of possible embodiments of the present invention.

A component for a gas turbine engine can include a gas path wall having a first surface, a second surface exposed to hot gas flow, and a cooling hole extending through the gas path wall. The cooling hole can include an inlet formed in the first surface, an outlet formed in the second surface, cooling hole surfaces that define the cooling hole between the inlet and the outlet, and a longitudinal ridge formed along at least one of the cooling hole surfaces. The longitudinal ridge can separate the cooling hole into first and second lobes. The cooling hole can diverge through the gas path wall, such that cross-sectional area of the cooling hole increases continuously from the inlet through the cooling hole to the outlet.

The component of the preceding paragraph can optionally include, additionally and/or alternatively any, one or more of the following features, configurations and/or additional components:

the longitudinal ridge can extend from the inlet along at least one of the cooling hole surfaces toward the outlet, dividing the cooling hole into the first and second lobes in a region of the inlet;

a cusp can be on the inlet and the longitudinal ridge can extend from the cusp;

a ridge terminus can be spaced along one of the cooling hole surfaces between the inlet and the outlet, the longitudinal ridge can terminate at the ridge terminus, and the longitudinal ridge can extend from the ridge terminus toward the outlet;

a ridge transition can be spaced along the longitudinal ridge between the inlet and the outlet, and a transition region of the cooling hole can extend from the ridge transition to a trailing edge of the outlet;

the longitudinal ridge can be a first longitudinal ridge such that first and second longitudinal ridges can divide the cooling hole into first, second, and third lobes;

a ridge nexus can be spaced along the cooling hole between the inlet and the outlet, the first and second longitudinal ridges can meet at the ridge nexus, the second lobe can be positioned between the first and third lobes, and the second lobe can truncate at the ridge nexus;

the first and second ridges can join at the ridge nexus to form a single longitudinal ridge that extends from the ridge nexus toward the inlet;

the first and second longitudinal ridges can terminate at the ridge nexus such that no longitudinal ridge extends from the ridge nexus toward the inlet; and/or the second surface can form one of a pressure surface, a suction surface or a platform surface of an airfoil.

An airfoil can include a flow path wall having a first surface exposed to cooling fluid and a second surface exposed to hot gas flow. A cooling hole can be formed in the flow path wall and be laterally diverging continuously from an inlet at the first surface to an outlet at the second surface. A longitudinal ridge can be defined along the cooling hole and divide the cooling hole into first and second lobes. Flow of the cooling fluid can be substantially diffusive through the cooling hole, from the inlet at the first surface of the flow path wall through to the outlet at the second surface of the flow path wall.

The airfoil of the preceding paragraph can optionally include, additionally and/or alternatively any, one or more of the following features, configurations and/or additional components:

the cooling hole can diverge continuously in longitudinal and transverse directions from the inlet to the outlet, and the longitudinal and transverse directions can be defined with respect to the hot gas flow;

the cooling hole can be inclined in a downstream direction between the first surface and the second surface;

the outlet can have a substantially straight or convex trailing edge;

the longitudinal ridge can be a first longitudinal ridge such that first and second longitudinal ridges can divide the cooling hole into first, second, and third lobes; and/or a gas turbine engine can include the airfoil.

A gas turbine engine component can include a gas path wall, a cooling hole extending through the gas path wall, and a longitudinal ridge extending along the cooling hole. The gas path wall can have a first surface and a second surface exposed to hot gas flow. The cooling hole can be continuously diverging from an inlet in the first surface to an outlet in the second surface. The longitudinal ridge can divide the cooling hole into first and second lobes.

The gas turbine engine component of the preceding paragraph can optionally include, additionally and/or alternatively any, one or more of the following features, configurations and/or additional components:

a cusp can be formed on the inlet, and the longitudinal ridge can extend from the cusp toward the outlet along a downstream wall of the cooling hole;

the longitudinal ridge can be a first longitudinal ridge such that first and second longitudinal ridges can divide the cooling hole into first, second, and third lobes; and/or a ridge transition can be spaced along the longitudinal ridge between the inlet and the outlet, and a planar or convex transition region can extend along the cooling hole from the ridge transition to a trailing edge of the outlet.

The invention claimed is:

1. A component for a gas turbine engine, the component comprising:
    a gas path wall having a first surface and a second surface, wherein the second surface is exposed to hot gas flow; and
    a cooling hole extending through the gas path wall, the cooling hole comprising:
        an inlet formed in the first surface;
        an outlet formed in the second surface;
        cooling hole surfaces that define the cooling hole between the inlet and the outlet;
        a first longitudinal ridge formed along at least one of the cooling hole surfaces, the first longitudinal ridge separating the cooling hole into first and second lobes;
        a ridge terminus spaced along one of the cooling hole surfaces between the inlet and the outlet, wherein the first longitudinal ridge terminates at the ridge terminus, and wherein the first longitudinal ridge extends from the ridge terminus toward the outlet;
        a second longitudinal ridge; and
        a third lobe, wherein the first and second longitudinal ridges divide the cooling holes into the first, second, and third lobes,
    wherein the cooling hole diverges through the gas path wall, such that cross-sectional area of the cooling hole increases continuously from the inlet through the cooling hole to the outlet, and
    wherein the first and second longitudinal ridges terminate at a ridge nexus.

2. The component of claim 1, wherein the first longitudinal ridge does not extend an entire distance between the inlet and the outlet.

3. The component of claim 1, wherein the first longitudinal ridge has a curved cross-sectional profile.

4. The component of claim 1, and further comprising:
    a ridge transition spaced along the first longitudinal ridge between the inlet and the outlet; and
    a transition region of the cooling hole extending from the ridge transition to a trailing edge of the outlet.

5. The component of claim 1, wherein the second lobe is positioned between the first and third lobes, and wherein the second lobe truncates at the ridge nexus.

6. The component of claim 5, wherein the first and second ridges join at the ridge nexus to form a single longitudinal ridge that extends from the ridge nexus toward the inlet.

7. The component of claim 1, wherein the second surface forms one of a pressure surface, a suction surface or a platform surface of an airfoil.

8. The component of claim 1, wherein the cooling hole diverges in longitudinal and transverse directions from the inlet to the outlet.

9. An airfoil comprising:
    a flow path wall having a first surface exposed to cooling fluid and a second surface exposed to hot gas flow;
    a cooling hole formed in the flow path wall, the cooling hole laterally diverging continuously from an inlet at the first surface to an outlet at the second surface;
    a first longitudinal ridge defined along the cooling hole, the first longitudinal ridge structure dividing the cooling hole into first and second lobes;
    a cusp on the inlet such that the first longitudinal ridge extends from the cusp toward the outlet at the second surface;

a second longitudinal ridge; and a third lobe, wherein the first and second longitudinal ridges divide the cooling hole into the first, second, and third lobes, wherein flow of the cooling fluid is substantially diffusive through the cooling hole, from the inlet at the first surface of the flow path wall through to the outlet at the second surface of the flow path wall.

10. The airfoil of claim 9, wherein the cooling hole diverges continuously in longitudinal and transverse directions from the inlet to the outlet, the longitudinal and transverse directions defined with respect to the hot gas flow.

11. The airfoil of claim 9, wherein the cooling hole is inclined in a downstream direction between the first surface and the second surface.

12. The airfoil of claim 9, wherein the outlet has a substantially straight or convex trailing edge.

13. A gas turbine engine comprising the airfoil of claim 9.

14. A gas turbine engine component comprising:

a gas path wall having a first surface and a second surface, the second surface exposed to hot gas flow;

a cooling hole extending through the gas path wall, the cooling hole continuously diverging from an inlet in the first surface to an outlet in the second surface;

a first longitudinal ridge extending along the cooling hole;

a second longitudinal ridge extending along the cooling hole; and a cusp formed on the inlet, wherein the first longitudinal ridge extends from the cusp toward the outlet along a downstream wall of the cooling hole and the second longitudinal ridge extends from the cusp toward the outlet along a downstream wall of the cooling hole, wherein the first longitudinal ridge and the second longitudinal ridge divide the cooling hole into first, second, and third lobes.

15. The gas turbine engine component of claim 14, further comprising:

a ridge transition spaced along the first longitudinal ridge between the inlet and the outlet; and a planar or convex transition region extending along the cooling hole from the ridge transition to a trailing edge of the outlet.

16. The gas turbine engine component of claim 14, wherein the cooling hole diverges in longitudinal and transverse directions from the inlet to the outlet.

* * * * *